United States Patent [19]

Newton

[11] 4,201,666
[45] May 6, 1980

[54] TREATING PULP-AND-PAPER MILL STREAMS

[75] Inventor: Joel A. Newton, Greensboro, N.C.

[73] Assignee: Sprague Electric Company, North Adams, Mass.

[21] Appl. No.: 32,052

[22] Filed: Apr. 23, 1979

[51] Int. Cl.² ............................ C02B 1/20; D21F 1/82
[52] U.S. Cl. ........................................ 210/47; 210/52; 162/29
[58] Field of Search .............................. 162/4, 29, 79; 210/42 R, 47, 51-54

[56] References Cited

U.S. PATENT DOCUMENTS

| | | | |
|---|---|---|---|
| 2,741,051 | 4/1956 | Reissig | 41/42 |
| 3,627,679 | 12/1971 | Fuller | 210/52 X |
| 3,960,648 | 6/1976 | Nakajima et al. | 210/53 X |
| 4,008,161 | 2/1977 | Wong et al. | 210/53 X |
| 4,136,026 | 1/1979 | Meyer et al. | 210/47 X |
| 4,155,845 | 5/1979 | Ancelle et al. | 162/29 X |

FOREIGN PATENT DOCUMENTS 51-41696  4/1976  Japan .
52-42649  3/1977  Japan .

OTHER PUBLICATIONS

*Chemical Abstracts*, vol. 85, 1976, p. 428, No. 130152s, Hirota et al., "Aluminum Compounds (as Coagulants)".
*Chemical Abstracts*, vol. 87, 1977, p. 331, No. 58171u, Tanaka, "Treatment of Waste Water from Pulp Plant".
*Chemical Abstracts*, vol. 86, 1977, p. 343, No. 145264z, Berov et al., "Use of Polyelectrolytes Based on Diethylaminoethyl Methacrylate for Purifying Waste Waters".

*Primary Examiner*—Thomas G. Wyse
*Attorney, Agent, or Firm*—Connolly and Hutz

[57] ABSTRACT

Aqueous pulp-and-paper mill waste streams are treated with a waste stream derived from the nitric acid etching of aluminum foil for electrolytic capacitors. This waste stream consists essentially of aqueous acidic aluminum nitrate, and a polyelectrolyte is added to it to synergistically improve flocculation, settling, and dosage rates.

3 Claims, No Drawings

TREATING PULP-AND-PAPER MILL STREAMS

BACKGROUND OF THE INVENTION

This invention relates to the removal of solids from aqueous pulp-and-paper mill streams by treating such streams with a waste derived in the nitric acid etching of aluminum foil for capacitor electrodes.

More particularly it relates to the treating of the aqueous pulp-and-paper waste streams with a waste consisting essentially of aqueous aluminum nitrate to which a polyelectrolyte has been added which acts synergistically to improve flocculation, settling, and dosage rates and decolorization.

It has become necessary to treat waste water for solids and color removal, among other things, before discharge. As requirements have become more stringent, it has become more difficult to provide for such treatment economically.

Increasingly, more attention is being paid to resource recovery from waste streams including the use of a waste from one process to treat another waste stream to neutralize or precipitate material from one or both of them, thus reducing the quantity of neutralizing and/or precipitating agents needed. In the case of precipitation, it is quite desirable that the solids be quite dense so they occupy as small a volume as possible to minimize the size of the necessary sludge beds.

SUMMARY OF THE INVENTION

One of the purposes of this invention is the utilization of a waste stream to treat another waste stream, thereby simplifying the disposal of each and reducing chemical requirements.

A more specific purpose is the utilization of a waste stream derived in the nitric acid etching of aluminum foil for electrolytic capacitors. Such a stream has utility by itself in solids removal from textile feed water streams and from pulp-and-paper mill wastes together with decolorization of the latter and gave better results than the usual alum treatment.

When a highly-charged, high molecular-weight cationic polyelectrolyte is added to the etching waste, a synergistic effect is obtained in improving flocculation and settling rates and decolorization.

DESCRIPTION OF THE PREFERRED EMBODIMENT

The aqueous waste stream derived in the nitric acid etching of aluminum foil consists essentially of acidic aqueous aluminum nitrate. The effluent etching waste stream analyzed 1M aluminum nitrate and 0.5M nitric acid. This stream may be concentrated, thus changing this concentration and dosage rates, without changing the scope of the invention.

In the examples below, the effluent had the above concentration. Sample size was 2 liters, and dosages for the etching effluent are in mg/l aluminum. One test with alum is included for comparison; its dosage rate is in mg/l alum (not aluminum). The pH was adjusted to provide a treated effluent with a pH of 6.6, the latter being the desired end pH for direct discharge of a treated effluent. Color is given in Platinum Cobalt (Pt-Co) units as described in *Standard Methods for the Examination of Water and Wastewater*, 14th ed., American Waterworks Assoc., p. 64–66.

Except for the alum example, samples were mixed at 100 rpm for 15 sec and then flocculated at 15 rpm for 15 sec. With alum, the samples was flocculated at 15 rpm for 20 min to provide the desired floc. Settled sludge volume was measured after 2 hrs. A cloudy solution refers to one through which a newspaper can be seen but not read; a clear solution is one that can be seen through quite easily. Small floc is about 0.5 mm or less, medium or average floc is 0.5–1.5 mm, and large floc is greater than 2 mm. Slow settling refers to a floc that takes more than 15 min to settle 10-inches. Moderate or average settling means that most floc settles 10-inches in 5–15 min, while fast settling means that most floc settles 10-inches in less than 5 min.

The polyelectrolyte is a highly-charged, high molecular-weight cationic one. Many such polyelectrolytes are commercially available, e.g., from Hercules Inc., Nalco Chemical Co., Rohm & Hass Inc., and Nopco Chemical Co. The one used in the tests reported below was Nopco 243.

EXAMPLE 1

In this example, wastewater from a pulp-and-paper mill initially having a color of 875 Pt-Co units was treated with etching waste alone, alum alone, and with etching waste plus 1 ppm Nopco 243. Etching waste is reported as mg/l aluminum and alum as mg/l alum, as noted before. One mg/l aluminum in the waste is equivalent to 11 mg/l alum; on that basis, 385 mg/l alum is equivalent to 35 mg/l aluminum in the etching waste. Tests 1–3 were made with etching waste alone, test 4 with alum alone, and tests 5–7 with 1 ppm polyelectrolyte added to raw wastewater before the etching waste. No floc was formed by the polyelectrolyte alone, nor was there decolorization.

Table 1

| Test | Etch Effluent | Alum | Settled Sludge, mls | Residual Color | Notes |
|---|---|---|---|---|---|
| 1 | 20 | — | 100 | 250 | Solution cloudy floc not settling |
| 2 | 35 | — | 100 | 175 | Medium floc, settles in 15 min |
| 3 | 50 | — | 150 | 100 | Large floc, settles in 10 min |
| 4 | — | 385 | 100 | 125 | Cloudy, small floc, settles slowly |
| 5 | 20 | — | 100 | 175 | Small floc, settles in 10 min |
| 6 | 35 | — | 150 | 100 | Medium floc, settles in 10 min, solution clearer |
| 7 | 50 | — | 200 | 90 | Medium floc, settles in 10 min, solution clearest |

The addition of the polyelectrolyte improved both settling rate and residual color, particularly at the 20 and 35 mg/l dosages. Tests 6 and 7 also resulted in total suspended solids reduction to 14 and 9 mg/l, respectively.

EXAMPLE 2

In this series, a wastewater stream from a different paper plant was treated with etching waste with or without polyelectrolyte. The color of the raw wastewater was 1000 Pt-Co units.

Table 2

| Test | Etch Effluent | Nopco 243 | Settled sludge, ml | Residual Color | Notes |
|---|---|---|---|---|---|
| 1 | 25 | — | 60 | 250 | Cloudy, floc forms but not coagulate |
| 2 | 50 | — | 90 | 175 | Flocculates quickly settles in 15 min |
| 3 | 25 | 1 ppm | 130 | 200 | Cloudy after effluent addition; after polymer added, coagulates & settles in 45 min |
| 4 | 50 | 1 ppm | 180 | 100 | Clear after effluent addition. Polymer gave larger floc & settles in 15 min. |

The polyelectrolyte addition improves the color and settling rate of the 25 mg/l dosage to that of the 50 mg/l alone, thus permitting lower dosage rates, e.g., cut in half. At both 50 mg/l dosage levels, total suspended solids were reduced to 12 and 8 mg/l, respectively.

The projected 1980 guidelines for treated pulp-and-paper mill streams of below 15 mg/l suspended solids and below 350 Pt-Co units color can be met by the present invention. It appears, although the parameter was not measured, that the sludge resulting from the present invention dewaters more easily than those obtained in prior art processes and also appears in the jar tests to be more compact.

Since the make-up of paper waste streams vary in the content and relative amounts of lignins, particularly thiolignins, oxylignins, and lignosulfonic acids, it will be necessary to test each for optimum dosages. Different polyelectrolytes may be used depending on availability and response to the waste stream make-up, e.g., a straight softwood derived stream vs a mixed softwood-hardwood stream. For the highly colored streams tested, a highly-charged, high molecular-weight cationic polyelectrolyte proved most effective. Also, since the etching effluent is acidic, its use with acidic waste streams was not contemplated as the neutralization needed if the resultant stream were to be discharged, instead of reused, would require large volumes of neutralizing agents, adding to already large liquid and solids handling volumes and problems. As mentioned before, the treatment was carried out to give a pH of 6.6 even though a more acid pH gave better flocculation results, and better decolorization was obtained at a slightly basic pH but neither gave a great enough difference to justify a neutralization step at the end.

What is claimed is:

1. A process for treating aqueous pulp-and-paper mill streams to remove solids comprising contacting said streams with a liquid stream derived in the nitric acid etching of aluminum consisting essentially of aqueous acidic aluminum nitrate, said liquid stream containing added high-molecular weight, highly cationic polyelectrolyte, thoroughly mixing these streams, allowing suspended solids to settle, and recovering a supernatant liquid of reduced solids content.

2. A process according to claim 1 where said aqueous streams are treated with 35–50 mg/l, calculated as aluminum, of said aqueous aluminum nitrate and containing 1 ppm polyelectrolyte at said aluminum concentration, said combination exerting a synergistic effect as measured by flocculation, settling, and dosage rates.

3. A process according to claim 1 wherein said aqueous streams are reduced in color by said treatment.

* * * * *